(12) United States Patent
Tröndle et al.

(10) Patent No.: US 7,780,194 B2
(45) Date of Patent: Aug. 24, 2010

(54) METHOD FOR PRODUCING AN AIR BAG

(75) Inventors: Birgit Tröndle, Albbruck (DE); Thomas Eschbach, Rheinheim (DE); Michael Becker, Zell im Wiesental (DE)

(73) Assignee: Global Safety Textiles GmbH, Maulburg (DE)

( * ) Notice: Subject to any disclaimer, the term of this patent is extended or adjusted under 35 U.S.C. 154(b) by 430 days.

(21) Appl. No.: 11/301,290

(22) Filed: Dec. 12, 2005

(65) Prior Publication Data
US 2006/0151882 A1 Jul. 13, 2006

Related U.S. Application Data

(63) Continuation of application No. PCT/EP2004/005607, filed on May 25, 2004.

(30) Foreign Application Priority Data

Jun. 13, 2003 (DE) .................. 103 26 757

(51) Int. Cl.
*B60R 21/23* (2006.01)
*B60R 21/235* (2006.01)
(52) U.S. Cl. ................. 280/743.1; 156/309.6; 442/76
(58) Field of Classification Search ............ 280/743.1; 156/309.6, 148; 442/76, 208; 428/34.1, 428/36.1, 447; 139/389, 387 R
See application file for complete search history.

(56) References Cited

U.S. PATENT DOCUMENTS

| 3,456,692 A | 7/1969 | Kronoff |
| 3,460,583 A | 8/1969 | Mosher |
| 3,996,971 A | 12/1976 | Griffith et al. |
| 4,004,616 A | 1/1977 | Andronov et al. |
| 4,174,738 A | 11/1979 | Berger et al. |
| 4,313,473 A | 2/1982 | Reiter |
| 4,565,535 A | 1/1986 | Tassy et al. |
| 4,660,605 A | 4/1987 | Koch |
| 4,977,016 A * | 12/1990 | Thornton et al. ........... 428/36.1 |
| 5,131,434 A * | 7/1992 | Krummheuer et al. ........ 139/35 |
| 5,296,278 A * | 3/1994 | Nishimura et al. ......... 428/36.1 |
| 5,299,603 A | 4/1994 | Reiter et al. |
| 5,333,899 A | 8/1994 | Witte et al. |
| 5,560,648 A | 10/1996 | Rhule et al. |

(Continued)

FOREIGN PATENT DOCUMENTS

DE 39 03 216 A1 8/1990

(Continued)

OTHER PUBLICATIONS

International Search Report for PCT/EP2004/005607 dated Aug. 3, 2004, 3 pages.

*Primary Examiner*—Paul N. Dickson
*Assistant Examiner*—George D. Spisich
(74) *Attorney, Agent, or Firm*—Harness, Dickey & Pierce, P.L.C.

(57) ABSTRACT

The invention relates to a method for the production of an air bag, more particularly a one-piece woven (OPW) air bag, comprising single layer and double layer areas, a top and bottom outer surface and a coating in at least certain areas. The invention is characteristic in that the single layer area is sealed in such a way that said areas are substantially impermeable to fluids.

28 Claims, 2 Drawing Sheets

U.S. PATENT DOCUMENTS

| | | | |
|---|---|---|---|
| 5,654,067 A | 8/1997 | Dinger et al. | |
| 5,700,532 A | 12/1997 | Chiou | |
| 5,707,711 A | 1/1998 | Kitamura | |
| 5,769,130 A | 6/1998 | Brielmann | |
| 5,789,084 A | 8/1998 | Nakamura et al. | |
| 5,826,905 A * | 10/1998 | Tochacek et al. | 280/743.1 |
| 5,952,250 A | 9/1999 | Kim et al. | |
| 6,007,092 A | 12/1999 | Martz | |
| 6,024,380 A | 2/2000 | Kim et al. | |
| 6,177,365 B1 | 1/2001 | Li | |
| 6,177,366 B1 | 1/2001 | Li | |
| 6,220,309 B1 * | 4/2001 | Sollars, Jr. | 139/389 |
| 6,265,690 B1 | 7/2001 | Förnsel et al. | |
| 6,299,206 B1 * | 10/2001 | Keshavaraj | 280/743.1 |
| 6,429,155 B1 | 8/2002 | Li et al. | |
| 6,451,715 B2 | 9/2002 | Li et al. | |
| 6,467,802 B2 | 10/2002 | Heigl | |
| 6,569,788 B1 | 5/2003 | Hurst et al. | |
| 6,595,244 B1 | 7/2003 | Sollars, Jr. | |
| 6,632,753 B1 | 10/2003 | Beasley, Jr. | |
| 6,641,165 B2 | 11/2003 | Ohhashi | |
| 6,645,565 B2 | 11/2003 | Veiga | |
| 6,672,617 B1 * | 1/2004 | Gilpatrick et al. | 280/743.1 |
| 6,698,458 B1 | 3/2004 | Sollars, Jr. et al. | |
| 6,701,971 B1 * | 3/2004 | Sollars et al. | 139/387 R |
| 6,705,244 B1 * | 3/2004 | Berger et al. | 112/475.06 |
| 6,734,124 B2 | 5/2004 | Hurst et al. | |
| 6,749,220 B1 * | 6/2004 | Wipasuramonton et al. | 280/743.1 |
| 6,753,275 B2 | 6/2004 | Veiga | |
| 6,770,578 B2 | 8/2004 | Veiga | |
| 6,866,068 B2 | 3/2005 | Berger et al. | |
| 6,883,557 B1 | 4/2005 | Eschbach et al. | |
| 6,918,410 B1 | 7/2005 | Berger et al. | |
| 6,918,411 B2 | 7/2005 | Berger et al. | |
| 6,994,125 B2 | 2/2006 | Tröndle et al. | |
| 7,069,961 B2 | 7/2006 | Sollars, Jr. | |
| 2001/0030416 A1 | 10/2001 | Tanabe et al. | |
| 2002/0033589 A1 | 3/2002 | Barnes | |
| 2002/0037755 A1 | 3/2002 | Rodemer et al. | |
| 2002/0038950 A1 | 4/2002 | Masuda et al. | |
| 2002/0043792 A1 * | 4/2002 | Keshavaraj | 280/743.1 |
| 2002/0060449 A1 * | 5/2002 | Keshavaraj | 280/743.1 |
| 2002/0125702 A1 | 9/2002 | Ohhashi | |
| 2002/0140218 A1 * | 10/2002 | Beasley, Jr. | 280/743.1 |
| 2002/0175510 A1 * | 11/2002 | Veiga | 280/743.1 |
| 2003/0060104 A1 | 3/2003 | Veiga | |
| 2003/0129339 A1 | 7/2003 | Barnes | |
| 2003/0166367 A1 * | 9/2003 | Berger et al. | 442/76 |
| 2004/0182468 A1 | 9/2004 | Trondle et al. | |
| 2004/0200540 A1 | 10/2004 | Busskamp et al. | |
| 2005/0161919 A1 * | 7/2005 | Berger et al. | 280/734 |
| 2006/0005913 A1 | 1/2006 | Berger | |
| 2006/0014456 A1 | 1/2006 | Li | |
| 2006/0016546 A1 | 1/2006 | Berger | |
| 2006/0151882 A1 | 7/2006 | Trondle et al. | |
| 2006/0249933 A1 | 11/2006 | Sollars | |
| 2007/0278775 A1 | 12/2007 | Ting et al. | |
| 2008/0147278 A1 | 6/2008 | Breed | |

FOREIGN PATENT DOCUMENTS

| | | |
|---|---|---|
| DE | 198 52 232 | 5/2000 |
| DE | 198 52 232 A1 | 5/2000 |
| DE | 198 57 034 | 8/2000 |
| EP | 0 477 521 | 4/1992 |
| EP | 0 733 732 | 9/1996 |
| EP | 1 238 867 | 9/2002 |
| GB | 1 603 572 | 11/1981 |
| GB | 2 251 410 | 7/1992 |
| JP | 3082645 | 4/1991 |
| JP | 10-187045 | 7/1998 |
| WO | WO 02/070252 | 9/2002 |
| WO | WO 2004/042128 | 5/2004 |
| WO | WO 2004/048658 | 6/2004 |

\* cited by examiner

METHOD FOR PRODUCING AN AIR BAG

CROSS REFERENCE TO RELATED APPLICATIONS

This is a continuation of Serial No. PCT/EP2004/005607, filed May 25, 2004, which claims priority to German Application No. 103 26 757.3, filed Jun. 13, 2003, both of which are incorporated by reference herein.

BACKGROUND AND SUMMARY OF THE INVENTION

The present invention relates to a method for producing a one-piece woven (OPW) air bag having single-layer and two-layer portions, an upper and lower outer surface and at least one coating applied portionally.

One-piece woven (OPW) air bags are known, comprising one or more portions whose outer upper and lower surface is coated, for example with a film. The film serves the purpose of preventing escape of a fluid or gas from the chamber formed in the multi-layer portion between the layers. Although the applied coatings are practically completely impermeable, the air bags as described above are not sufficiently fluid-tight. Because of this, the useful life of air bags, particularly of side and head air bags as demanded by industry, is difficult to attain or only by highly expensive generators which recharge the escaped gas in several stages or compensated by an added amount of propellant to equalize the gas loss. Apart from this the air bags as just described have the drawback that gas leakages can gain access to the interior of the vehicle making use of such an air bag possibly a health problem, due to the gas as such or its high temperature.

The invention is based on the object of proposing a method for producing an air bag which avoids or at least greatly diminishes the drawbacks of prior art. It has been surprisingly discovered that leakage of air bags is caused by a gas permeability of the single-layer fabric edging the air bag in a seam-like connection. What happens here is that the gas escapes from the chambers of the air bag through the single-layer, i.e. in the plane of the fabric located between the coatings of the upper and lower outer surface. The problem forming the basis of the invention is optimally solved by sealing the single-layer portion so that it is impermeable to fluids.

In one advantageous aspect of the invention the single-layer portions are provided at least in part with a fabric structure which is wovingly less dense than the remaining fabric. This now makes it possible for an applied coating, for example a film or laminate to penetrate deeper into the less densely woven fabric of the single-layer portion, and possible so deeply that the coatings come into contact in the interior of the single-layer portion in thus forming a "horizontal" closure which seals the single-layer portion of the fabric plane. This now makes it practically impossible for inflation gas to escape from the chambers formed by the two-layer portion.

A similar advantage is featured by another aspect of the invention wherein a low-viscosity coating is applied. This, similar to the method as just described, permits very deep penetration of the coating into the fabric in the single-layer portion in thus achieving complete sealing with the advantages as just described above. A likewise advantageous aspect of the invention materializes from a method in which the single-layer portion is thermally sealed. Thus, in this case by heating the edging, fusion of the upper and lower coating is achieved at the outermost edging of an air bag, again resulting in a substantially complete closure or seal of the single-layer portion.

BRIEF DESCRIPTION OF THE DRAWINGS

For a better understanding the invention will now be detailed by way of example with reference to a drawing in which.

DETAILED DESCRIPTION

Figure 1:
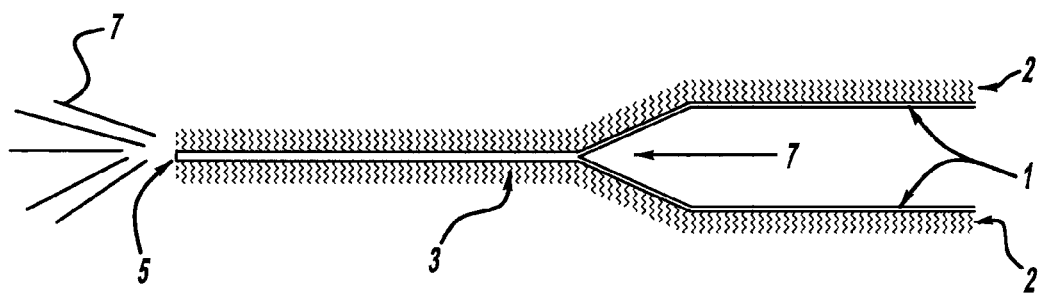
FIG. 1 is a greatly simplified diagrammatic view of a section through a prior art air bag with a single-layer portion adjoined by a two-layer portion, from which gas under pressure can escape.

Referring now to FIG. 1 there is illustrated on the left a single-layer portion 3 which translates into a two-layer portion 1 in the middle of the FIG. Illustrated on both extreme outer surfaces in the two-layer portion 1 is a coating 2, for example in the form of an applied laminate or film which is intended to seal the fabric so tightly that no gas can escape via the surfaces of the air bag. In the example as shown in FIG. 1, however, the gas 7 under high pressure can drift through the single-layer fabric structure 3 in the plane of the fabric (to the left as shown in FIG. 1) and emerge at the location 5.

Figure 2:
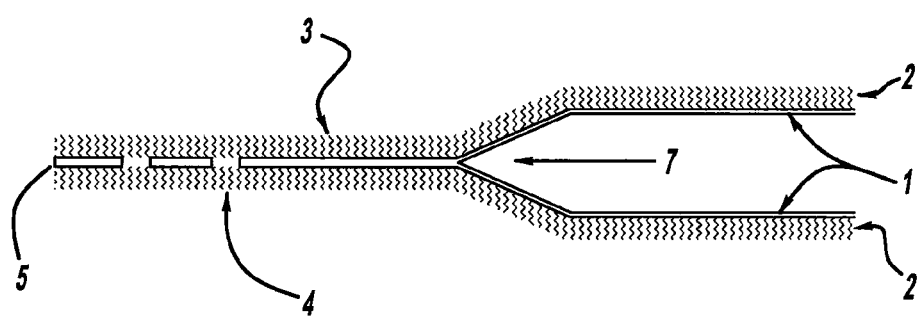
FIG. 2 is a view similar to that of FIG. 1 showing a section of an air bag but with sealing as implemented by the method in accordance with the invention.
Figure 3:
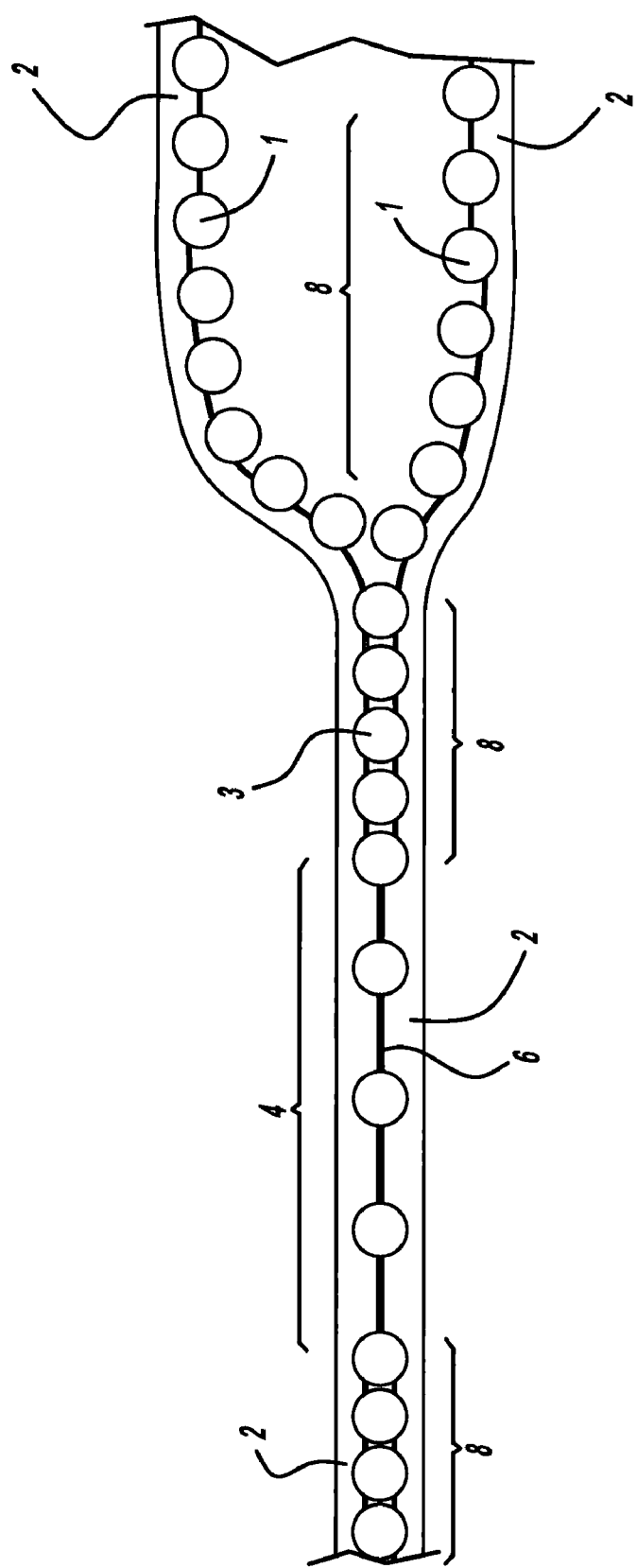
FIG. 3 is an enlarged and diagrammatic view from FIG. 2, showing a section of the air bag with sealing as implemented by the method in accordance with the invention.

Referring now to FIG. 2 there is illustrated how the single-layer portion 3 features portionally a less denser structure 4 achieved, for example, by weaving. This less denser structure 4 makes it possible for the coating 2 to penetrate deeper into the fabric as compared to the denser portions in the design. Referring to FIGS. 2 and 3, fabric portions 8 have a denser weave than does less dense portion 6. This can also be implemented in such a way that the two applied coatings come into contact in the middle 6 (see FIG. 3) of the fabric of the single-layer portion 3 with the less denser structure 4 in sealing this portion. This now prevents gas 7 under pressure from drifting through the single-layer portion 3 and emerging from the air bag at the location 5.

The same effect is achieved in accordance with the invention by making use of a low-viscosity coating capable of penetrating deeper into the single-layer fabric in creating a seal thereof. By thermally sealing the single-layer portion, for instance at the location 5 as shown in FIGS. 1 and 2, whereby the coatings 2 of the upper and lower fabric layer are interconnected, sealing the single-layer portion is likewise possible in achieving an optimum seal of the air bag.

Implementing the method in accordance with the invention achieves a substantial better air bag, ensuring a substantially higher seal. This now makes it possible to very easily attain the specified long useful life, since the amount of gas having escaped by leakage is substantially reduced.

The invention claimed is:
1. A one-piece woven air bag comprising:
a coating; and
single-layer and two-layer portions, including upper and lower outer surfaces having the coating applied thereon, the portions being woven together as a single fabric structure with the two-layer portion defining an inflation chamber;
the single-layer portions being internally sealed in a woven plane such that they are substantially impermeable to fluids;

the single-layer portions being provided at least in part with denser woven structure portions and with a less densely woven structure as compared to the density of the two-layer portion;

the coating on the upper and lower outer surfaces of the single-layer portions penetrating deeper into the air bag at the less densely woven structure as compared to the denser woven structure portions, the coating penetrating so deeply into the less densely woven structure portions that the coating from each outer surface comes into contact in the interior of the single-layer portions.

2. The air bag as set forth in claim 1, wherein the coating is a film.

3. The air bag as set forth in claim 1, wherein the coating is a laminate.

4. The air bag as set forth in claim 1, wherein the coating is heat sealed at a location spaced away from the less densely woven structure.

5. The air bag as set forth in claim 1, wherein the coating has a low-viscosity.

6. The air bag as set forth in claim 1, wherein the one-piece woven air bag is a vehicular air bag.

7. The air bag as set forth in claim 1, wherein the dense woven sections create an inflation chamber between the layers.

8. A one-piece woven air bag comprising:
a single fabric layer portion including a densely woven section and a less densely woven section, a greater area of the single layer portion being of the densely woven section than of the less densely woven section;
a multiple fabric layer portion comprising a section more densely woven than a less densely woven section of the single layer portion, the single and multiple layer portions being woven together as a single piece with the densely woven section of the multiple layer portion defining an inflation chamber between the layers, the multiple layer portion being woven to the single layer portion as a single piece; and
a coating located on exterior surfaces of at least the less densely woven section of the single layer portion penetrated through the less densely woven section and sealing together at an interior of the less densely woven section.

9. The air bag as set forth in claim 8, wherein the coating is a film.

10. The air bag as set forth in claim 8, wherein the coating is a laminate.

11. The air bag as set forth in claim 8, wherein the coating is heat sealable.

12. The air bag as set forth in claim 8, wherein the coating has a low-viscosity.

13. The air bag as set forth in claim 8, wherein the one-piece woven air bag is a vehicular air bag and the single fabric layer portion includes sections of different weave densities.

14. A vehicular air bag comprising:
a single layer fabric portion;
a second fabric portion comprising multiple layers which are separable from each other, the single and second fabric portions being made together as a one-piece air bag with the two-layer portions creating an inflation chamber therebetween; and
gas impermeable material located on opposite exterior surfaces of the fabric portions and sealing together at an interior of the single layer fabric portion.

15. The air bag as set forth in claim 14, wherein the gas impermeable material is a film.

16. The air bag as set forth in claim 14, wherein the gas impermeable material is a laminate.

17. The air bag as set forth in claim 14, wherein the gas impermeable material is heat sealed.

18. The air bag as set forth in claim 14, wherein the gas impermeable material has a low-viscosity.

19. The air bag as set forth in claim 14, wherein the gas impermeable material is located on exterior surfaces of both the single and multiple layer portions.

20. The air bag as set forth in claim 14, wherein the gas impermeable material penetrates so deeply into less densely woven sections as to create a closure which internally seals the single layer portion and assists in preventing inflation gas from escaping from an inflation chamber created by the multiple layers of the second portion.

21. The air bag as set forth in claim 14, wherein more densely woven sections create an inflation chamber between the multiple layers of the second portion.

22. The air bag as set forth in claim 14, wherein the single layer portion includes denser woven sections and less densely woven sections, as compared to the density of the second portion.

23. A one-piece woven (OPW) air bag including woven fabric, the air bag comprising a single-layer portion woven together with a two-layer portion as one-piece, a coating applied on an upper and a lower outer surface of the portions, the single-layer portion being sealed in the plane of the woven fabric such that it is substantially impermeable to fluids, the single-layer portion being provided at least in part with a denser woven structure and with a less densely woven structure as compared to the density of the two-layer portion, and the coating on the upper and lower outer surfaces having penetrated deeper into the woven of the less densely woven structure as compared to the denser woven structure such that the coating from each outer surface comes into contact with each other in the interior of the single-layer portion of the OPW air bag.

24. The air bag as set forth in claim 23, wherein coatings are of low viscosity and the OPW air bag is a vehicular air bag.

25. The air bag as set forth in claim 23, wherein the single-layer portions are thermally sealed at a location spaced away from the less densely woven structure.

26. The air bag as set forth in claim 23, wherein the coating is a film.

27. The air bag as set forth in claim 23, wherein the coating is a laminate.

28. The air bag as set forth in claim 23, wherein the coating is heat sealable.

* * * * *